(12) United States Patent
Ramirez

(10) Patent No.: US 11,864,509 B2
(45) Date of Patent: Jan. 9, 2024

(54) MODULAR GROW BOXES AND ASSOCIATED SYSTEMS AND METHODS

(71) Applicant: Adam Ramirez, Auburn, WA (US)

(72) Inventor: Adam Ramirez, Auburn, WA (US)

( * ) Notice: Subject to any disclaimer, the term of this patent is extended or adjusted under 35 U.S.C. 154(b) by 0 days.

(21) Appl. No.: 17/891,519

(22) Filed: Aug. 19, 2022

(65) Prior Publication Data

US 2023/0038760 A1     Feb. 9, 2023

Related U.S. Application Data

(62) Division of application No. 16/818,119, filed on Mar. 13, 2020, now Pat. No. 11,452,266.

(51) Int. Cl.
    *A01G 9/02*      (2018.01)
    *A01G 31/02*      (2006.01)

(52) U.S. Cl.
    CPC .............. *A01G 9/02* (2013.01); *A01G 31/02* (2013.01)

(58) Field of Classification Search
    CPC ..................................................... A01G 9/023
    See application file for complete search history.

(56) References Cited

U.S. PATENT DOCUMENTS

| | | | |
|---|---|---|---|
| 1,865,960 A | 7/1932 | Rubin | |
| 4,145,841 A * | 3/1979 | Woolpert | A01G 9/02 47/66.1 |
| 4,299,054 A | 11/1981 | Ware | |
| 4,790,105 A * | 12/1988 | Wareing | B65D 85/52 47/84 |
| 6,431,460 B1 * | 8/2002 | Lo | A01G 31/02 119/312 |

(Continued)

FOREIGN PATENT DOCUMENTS

| | | |
|---|---|---|
| CA | 2996234 A1 | 8/2019 |
| CN | 108954630 A | 12/2018 |

(Continued)

OTHER PUBLICATIONS

International Search Report and Written Opinion dated Jul. 8, 2021 in International Patent Application No. PCT/US21/21980, 36 pages.

*Primary Examiner* — Magdalena Topolski
*Assistant Examiner* — Katherine Anne Kloecker
(74) *Attorney, Agent, or Firm* — Perkins Coie LLP

(57) ABSTRACT

The present technology is generally directed to modular grow boxes for growing microgreens and other plants. The modular grow boxes generally include a first modular element having a plate and one or more walls extending therefrom to form a chamber, a second modular element having a platform for supporting a growth medium, and a third modular element that can act as a cover and/or base. The first, second, and third modular elements can be assembled in a first configuration that provides a generally enclosed area for growing plants during a germination phase. The first, second, and third modular elements can also be assembled in a second configuration that provides a partially exposed area for growing plants during a post-germination phase. In some embodiments, the modular grow boxes provide a self-contained, self-watering apparatus that is expected to simplify the process of growing microgreens and other plants.

20 Claims, 15 Drawing Sheets

(56) References Cited

U.S. PATENT DOCUMENTS

| | | | |
|---|---|---|---|
| 9,326,455 B2 | 5/2016 | Mcclay | |
| 10,455,777 B1 | 10/2019 | Dennison | |
| 10,721,874 B2 * | 7/2020 | Uglialoro | B42D 15/02 |
| 2004/0200142 A1 | 10/2004 | Ito | |
| 2005/0039397 A1 | 2/2005 | Roy | |
| 2009/0223124 A1 | 9/2009 | Pasquariello | |
| 2012/0137581 A1 | 6/2012 | Teasdale | |
| 2012/0240466 A1 * | 9/2012 | Anderson | A01G 9/045 47/80 |
| 2013/0318871 A1 * | 12/2013 | Street | A01G 9/021 47/65.5 |
| 2015/0282442 A1 | 10/2015 | Marshall | |
| 2017/0035007 A1 | 2/2017 | Haberman | |
| 2017/0339841 A1 | 11/2017 | Monasterio | |

FOREIGN PATENT DOCUMENTS

| | | |
|---|---|---|
| CN | 109964685 A | 7/2019 |
| CN | 110301342 A | 10/2019 |
| FR | 2850241 A1 | 7/2004 |
| GB | 2489710 A | 10/2012 |
| WO | 2015107590 A1 | 7/2015 |
| WO | 2019028145 A1 | 2/2019 |
| WO | 2019228223 A1 | 12/2019 |
| WO | 2020005319 A1 | 1/2020 |
| WO | 2020043355 A1 | 3/2020 |
| WO | 2020051271 A1 | 3/2020 |

* cited by examiner

MODULAR GROW BOXES AND ASSOCIATED SYSTEMS AND METHODS

CROSS-REFERENCE TO RELATED APPLICATION

The present application is a divisional of U.S. patent application Ser. No. 16/818,119, filed Mar. 13, 2020, the entire content of which is incorporated herein by reference.

TECHNICAL FIELD

The present technology is generally related to systems and methods for growing microgreens and other plants, and in particular to modular grow boxes.

BACKGROUND

Growing and cultivating microgreens and other plants in high concentrations is a technical process. For example, a plant may require different levels of moisture and/or light at different stages throughout the life cycle of the plant. Failing to provide adequate light and/or moisture at these stages can affect, among other things, plant quality and yield. In the germination phase, for example, seeds that are under moisturized tend to be dry, which can result in a low germination rate. However, seeds that are over moisturized can also result in a low germination rate (e.g., via damping off). Moreover, to promote growth once germinated, plants often need different levels of moisture and light than during the germination stage. Therefore, the process of growing microgreens and other plants in high concentrations typically requires substantial oversight and frequent manual intervention to ensure adequate conditions that promote plant growth.

DETAILED DESCRIPTION

Figure 1A:
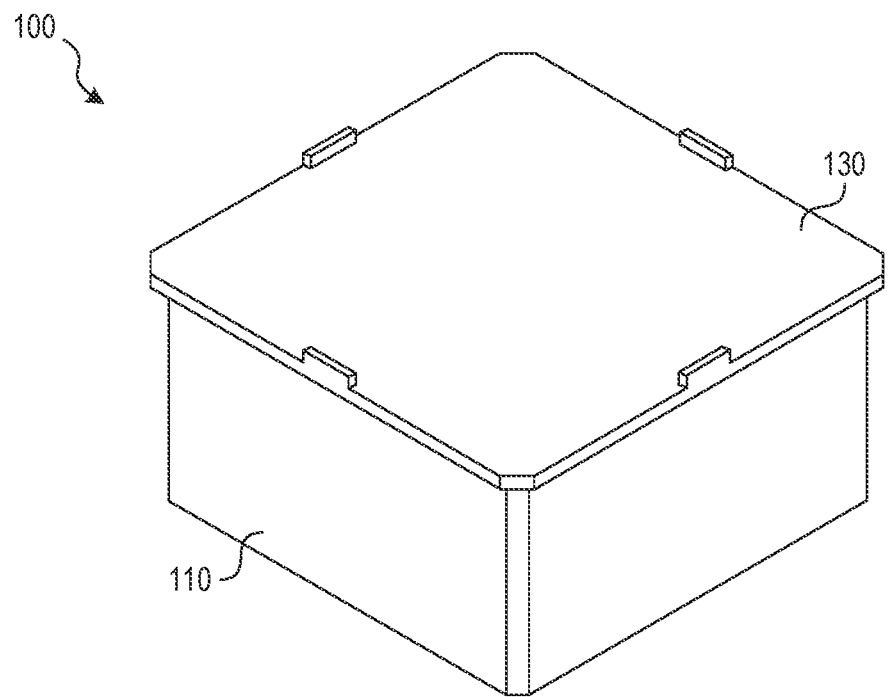
FIGS. 1A and 1B illustrate a modular grow box configured in accordance with select embodiments of the present technology.

The present technology is generally directed to modular grow boxes for growing plants, including microgreens, herbs, flowers, and the like. The modular grow boxes generally include a first modular element having a plate and one or more walls extending therefrom to form a chamber, a second modular element having a platform for supporting a growth medium, and a third modular element that can act as a cover and/or base. The first, second, and third modular elements can be assembled in a first configuration that provides a generally enclosed area for growing plants during a germination phase. The first, second, and third modular elements can also be assembled in a second configuration that provides a partially exposed area for growing plants during a post-germination phase. In some embodiments, the modular grow boxes provide a self-contained, self-watering apparatus that is expected to simplify the process of growing microgreens and other plants.

The terminology used in the description presented below is intended to be interpreted in its broadest reasonable manner, even though it is being used in conjunction with a detailed description of certain specific embodiments of the present technology. Certain terms may even be emphasized below; however, any terminology intended to be interpreted in any restricted manner will be overtly and specifically defined as such in this Detailed Description section. Additionally, the present technology can include other embodiments that are within the scope of the claims but are not described in detail with respect to FIGS. 1A-11.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Reference throughout this specification to relative terms such as, for example, "generally," "approximately," and "about" are used herein to mean the stated value plus or minus 10%. For example, the use of the term "about 100" refers to a range of from 90 to 110, inclusive. In instances where relative terminology is used in reference to something that does not include a numerical value, the terms are given their ordinary meaning to one skilled in the art.

As used herein, the term "plant" refers to any vegetation that can be cultivated and/or harvested. For example, the term plant includes, but is not limited to, microgreens, sprouts, herbs, vegetables, flowers, shrubs, and other edible and non-edible plants.

A. Microgreens and Other Plants

The present technology provides modular grow boxes for cultivating microgreens and other plants. Microgreens are edible greens harvested at an early stage in their growth life cycle, and typically after the cotyledon leaves have developed. Microgreens can be produced from various kinds of vegetables, herbs, and other plants, including, for example, amaranth, anise, arugula, basil, beets, bok choy, broccoli, buckwheat, cabbage, cauliflower, chard, chia, chives, Chinese mustard, cilantro, coriander, corn shoots, cress, dill, endive, fennel, fenugreek, kale, leek, peas, spinach, sorrel, and the like. At harvesting, microgreens typically range in size from about 1 inch to about 3 inches, including the stem and leaves. During harvesting, the stem is cut just above the soil line.

The life cycle of microgreens from germination to harvesting is typically between about 10 to 14 days, although this period can be longer or shorter depending on the type of microgreen and the desired size of the microgreens at harvest. During the germination phase, a growth medium with seeds is placed in a high humidity and low light environment to facilitate high germination rates. The germination phase is typically 2-6 days. After the germination phase, the seeds are exposed to light for a post-germination growth phase. During the post-germination growth phase, the seeds and resulting plants must be frequently watered to ensure the seeds and resulting plants remain moist. This typically involves applying water to the growth medium several times a day (e.g., if using a soil-based growth medium) or submerging the growth medium in a tub of water (e.g., if using a hydroponic growth medium). Due to the divergent needs during the germination phase and the post-germination growth phase, typical systems for growing microgreens include different components for the germination phase and the post-germination phase. Such systems also require frequent user intervention to water the growing microgreens. The present technology, however, provides a self-contained, self-watering apparatus (e.g., a modular grow box) that is transitionable between a first configuration for the germination phase and a second configuration for the post-germination growth phase to simplify the microgreen growth process.

B. Select Embodiments of Modular Grow Boxes and Associated Uses

Figure 1B:
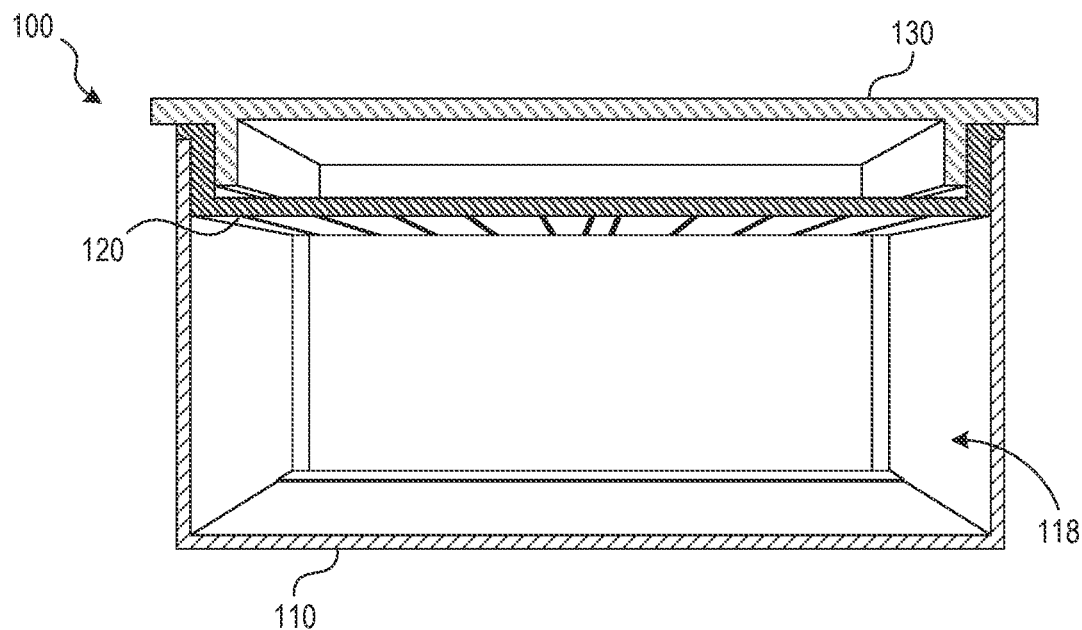

FIG. 1A is an isometric view of a modular grow box 100 ("box 100") configured in accordance with select embodiments of the present technology. FIG. 1B is a cross-sectional view of the box 100 and illustrates an interior of the box 100. Referring to FIG. 1A and FIG. 1B together, the box 100 generally includes a first modular element 110, a second modular element 120, and a third modular element 130. As described in greater detail below, the first modular element 110, the second modular element 120, and the third modular element 130 can be assembled in a variety of configurations and orientations, depending on the desired use of the box 100. For example, in the illustrated configuration and best shown in FIG. 1B, the box 100 can be assembled to define an enclosed chamber 118 between the first modular element 110 and the second modular element 120. The third modular element 130 is positioned generally above the second modular element 120 to form a cover. As described in greater detail below, the box 100 can be transitioned between several configurations, including the configuration shown in FIGS. 1A and 1B, to support the growth of microgreens and other plants.

Figure 2:
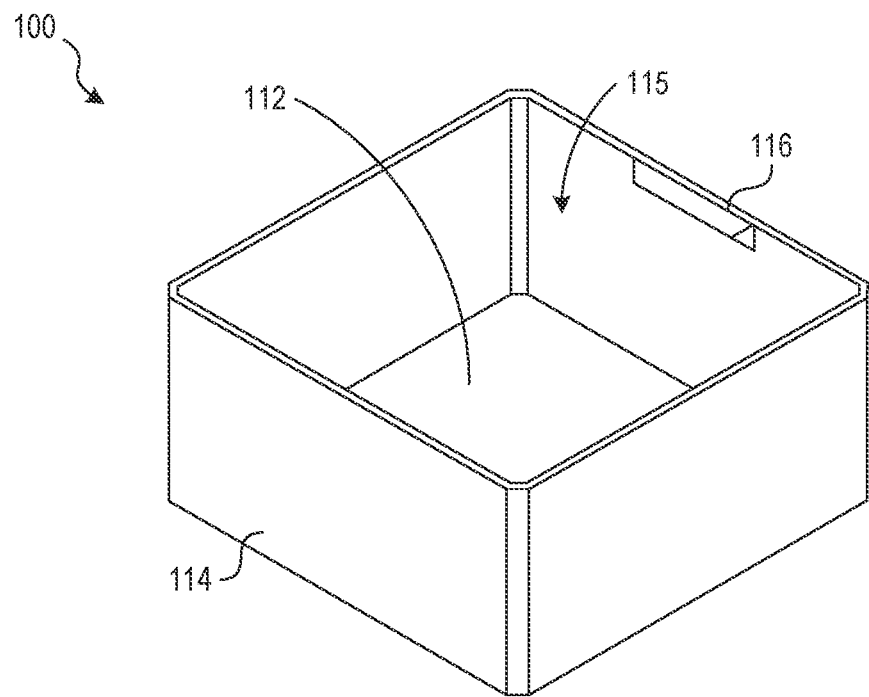
FIG. 2 illustrates a first modular element of the modular grow box shown in FIGS. 1A and 1B and configured in accordance with select embodiments of the present technology.

FIG. 2 illustrates the first modular element 110 with the other aspects of the box 100 omitted for clarity. The first modular element 110 can be a container, a receptacle, a bucket, or the like. Accordingly, the first modular element 110 can have a plate 112 and a plurality of walls 114 extending from an outer perimeter of the plate 112 to define an open chamber 115. Although illustrated as having a generally rectangular shape, the plate 112 can have other suitable shapes, including, for example, circular, oval, triangular, pentagonal, etc. The plurality of walls 114 can be integral with the plate 112 or otherwise secured to the plate 112 to provide a generally airtight seal therebetween. The first modular element 110 can optionally include one or more support elements 116 configured to releasably engage one or more features of the second modular element 120 (FIG. 3) and/or the third modular element 130 (FIG. 4). The support element 116 can be a tab, a latching mechanism, or the like. The first modular element 110 can be made of any material capable of holding water. For example, the first modular element 110 can be composed of plastic, wood, steel, stainless steel, metal, glass, or the like. As described in greater detail below with reference to FIGS. 5A and 5B, the first modular element 110 can be a humidity chamber when the box 100 is in a first configuration and a reservoir configured to hold water when the box 100 is in a second configuration.

Figure 3:
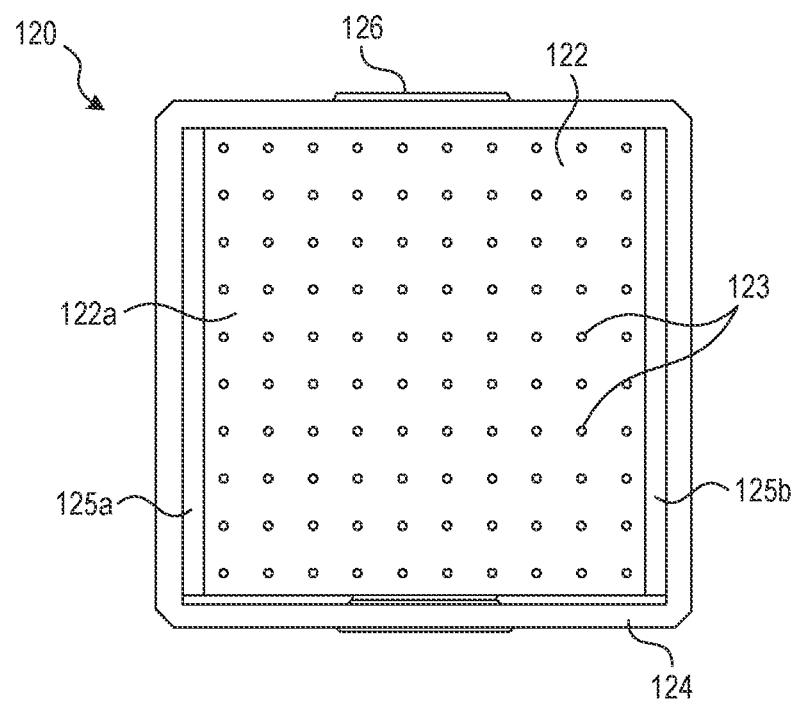
FIG. 3 illustrates a second modular element of the modular grow box shown in FIGS. 1A and 1B and configured in accordance with select embodiments of the present technology.
Figure 4:
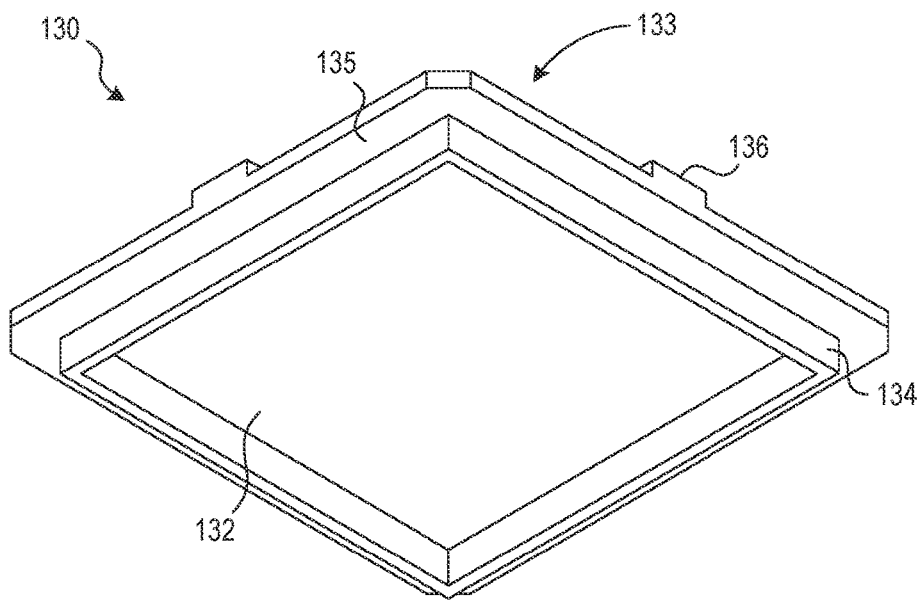
FIG. 4 illustrates a third modular element of the modular grow box shown in FIGS. 1A and 1B and configured in accordance with select embodiments of the present technology.

FIG. 3 illustrates the second modular element 120 shown in FIGS. 1A and 1B with the other aspects of the box 100 omitted for clarity. The second modular element 120 includes a platform 122 having a plurality of apertures 123 and a rim 124 (e.g., an elevated rim) extending generally around the outer perimeter of the platform 122. The apertures 123 can extend between a first (e.g., upper) surface 122a and an opposing second (e.g., lower) surface (not shown) of the platform 122 and can be configured to aerate and/or drain the platform 122. The rim 124 can extend generally outward from the platform 122 to form an elevated ridge surrounding the platform 122. The platform 122 can be spaced apart from the rim 124 at a first gap 125a and a second gap 125b. The second modular element 120 can be made of the same or different material than the first modular element 110. For example, the second modular element 120 can be composed of plastic, wood, steel, stainless steel, metal, glass, or the like. As described in greater detail below with reference to FIGS. 5A and 5B, the platform 122 can support a growth medium for growing microgreens and other plants.

The second modular element 120 can be sized and shaped to fit at least partially within the first modular element 110. For example, the platform 122 and the rim 124 can be sized and shaped to at least partially fit within the open chamber 115 defined by the first modular element 110 (FIG. 2). In particular, the outer perimeter of the platform 122 can be less than an internal dimension of the plurality of walls 114 such that the platform 122 can reside at least partially within the open chamber 115. Accordingly, the platform 122 and/or the rim 124 can be circular, oval, triangular, rectangular, pentagonal, etc., to generally match the shape of the plate 112. The second modular element 120 can optionally include one or more engagement elements 126 (e.g., tabs, flanges, latches, or the like) configured to engage with a corresponding one or more of the support elements 116 on the first modular element 110 (FIG. 2). Together, the engagement elements 126 and the support elements 116 can keep the second modular element 120 spaced apart from and suspended above the plate 112 of the first modular element 110 when the second modular element 120 is positioned within the first modular element 110 (as best seen in FIG. 1B). In some embodiments, the rim 124 itself can be sized and shaped to secure the second modular element 120 to the first modular element 110. For example, the rim 124 can include a flange (not shown) configured to engage the plurality of walls 114 and hold the second modular element 120 in a desired orientation and position relative to the first modular element 110. In some embodiments, the rim 124 can have both a flange and an engagement element 126. In some embodiments, the rim 124 can have a friction fit with one or more of the plurality of walls 114 to secure the second modular element 120 in a desired orientation and position relative to the box 110.

FIG. 4 illustrates the third modular element 130 with the other aspects of the box 100 omitted for clarity. As illustrated, the third modular element 130 has a first side 132 having a ridge 134 extending therefrom. The ridge 134 can be spaced radially inward from an outer edge of the first side 132 such that an overhang portion 135 extends between the ridge 134 and the edge of the first side 132. As shown best in FIG. 1B, the ridge 134 can be sized and shaped to fit within the rim 124 on the second modular element 120.

Referring back to FIG. 4, the third modular element 130 has a second side 133 generally opposite the first side 132. The second side 132 can include one or more pegs 136 extending therefrom. The one or more pegs 136 can be spaced apart on the second surface 133 in any combination and configuration that is suitable to provide a generally stable base. The third modular element 130 can be made of the same or different material than the first modular element 110 and the second modular element 130. For example, the third modular element 130 can be composed of plastic, wood, steel, stainless steel, metal, glass, or the like. As described in greater detail below, the third modular element 130 can act as a base and/or a cover for the box 100 in various configurations.

Figure 5A:
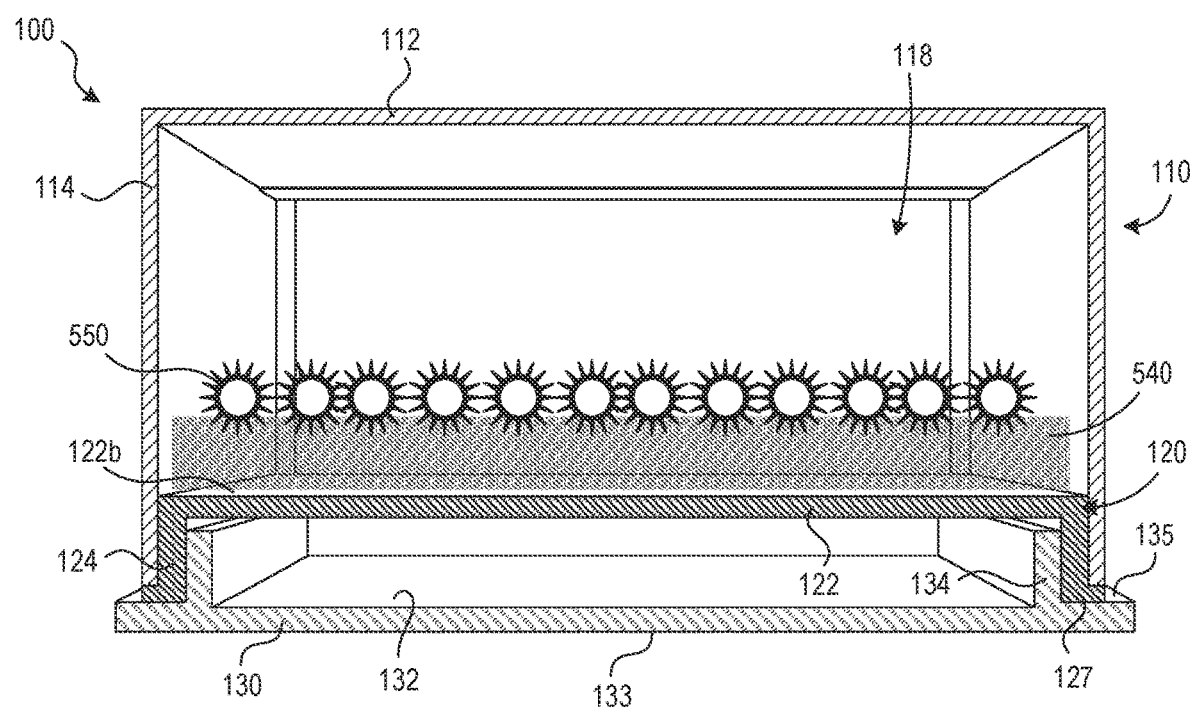
FIGS. 5A-5C illustrate various configurations of the modular grow box shown in FIGS. 1A and 1B and configured in accordance with select embodiments of the present technology.
Figure 5B:
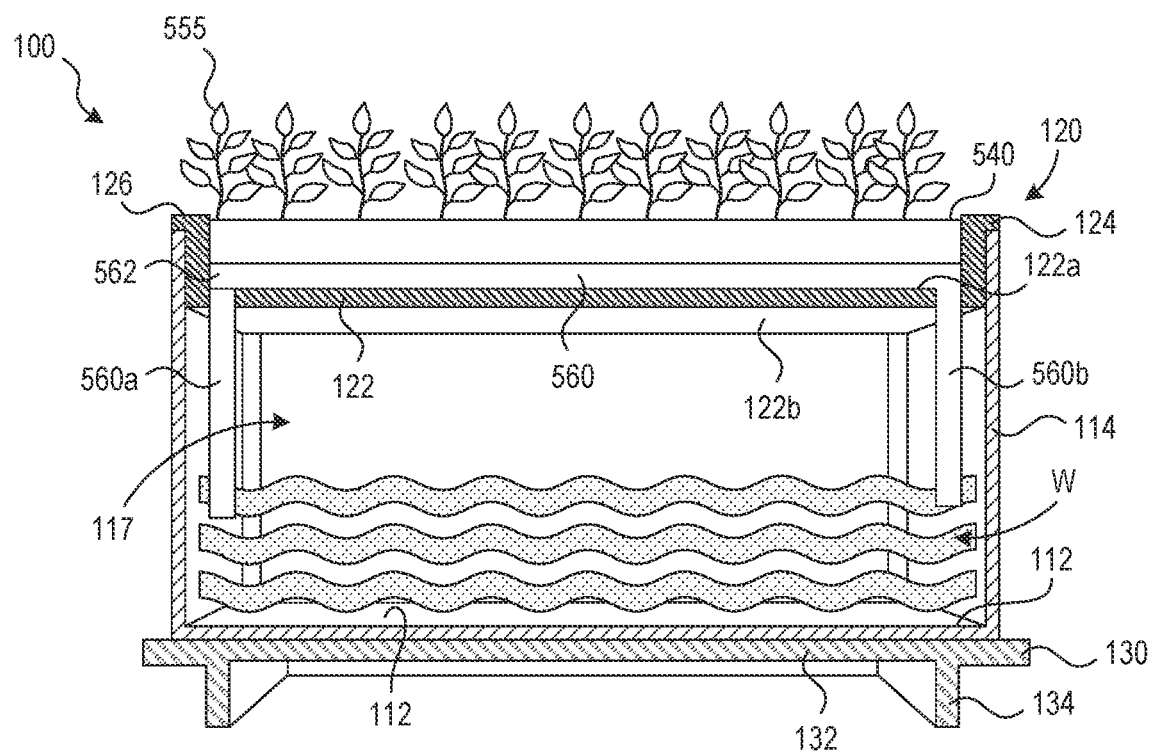
Figure 5C:
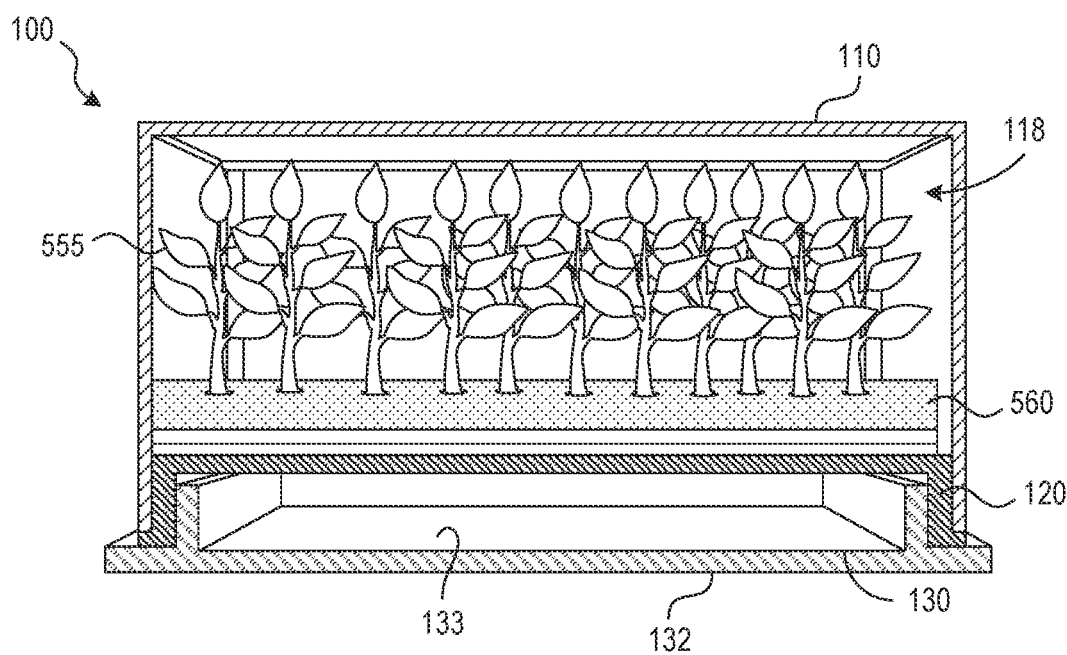

As illustrated in FIGS. 5A-5C, the box 100 can be assembled into different configurations that are specific to various stages of plant growth by changing the relative positioning of the first modular element 110, the second modular element 120, and the third modular element 130. FIG. 5A, for example, illustrates a first configuration of the box 100 for use during a germination phase of plant growth. In the first configuration, the third modular element 130 is positioned such that the second surface 133 is facing generally downwards and in contact with a generally stable surface (e.g., a floor, a shelf, etc.). As a result, the first surface 132 with the ridge 134 is facing generally upwards. The second modular element 120 is positioned on top of the third modular element 130 such that the rim 124 of the second modular element 120 extends around and/or otherwise engages the ridge 134 on the third modular element 130. Accordingly, in some embodiments, the distance between opposite segments of the ridge 134 is less than the distance between opposite segments of the rim 124. In other embodiments, however, the distance between opposite segments of the ridge 134 can be greater than the distance between opposite segments of the rim 124, and the rim 124 can engage the second modular element 120 at a portion interior to the ridge 134. Returning to the illustrated embodiment, a distal portion 127 of the rim 124 (e.g., the tab 126 and/or a flange) can engage the overhang portion 135 of the first surface 132. The first modular element 110 can be placed over the second modular element 120 and the third modular element 130 to form a generally enclosed chamber 118. For example, the first modular element 110 can be oriented such that the plate 112 is positioned generally above the second modular element 120 and the plurality of walls 114 engage the overhang portion 135 or other suitable portion of the second modular element 120 or the third modular element 130. In such embodiments, the generally enclosed chamber 118 is defined by an interior surface of the plate 112, an interior surface of the walls 114, and the second surface 122b of the platform 122. The generally enclosed chamber 118 can be partially and/or substantially shielded from an environment external to the box 100 to provide a substantially dark and/or airtight environment.

In the first configuration, the second surface 122b of the platform 122 is configured to support a growth medium. Accordingly, as illustrated, a growth medium 540 can be positioned on second surface 122b of the second modular element 120 such that the growth medium 540 is within the generally enclosed chamber 118. Without being bound by theory, it is expected that the first configuration illustrated in FIG. 5A provides an atmosphere conducive to promoting germination of seeds. For example, the generally enclosed chamber 118 can provide advantageous humidity and/or light levels to seeds 550 disposed on and/or in the growth medium 540 to promote germination of the seeds 550.

In some embodiments, the growth medium 540 can be a non-soil growth medium. For example, suitable non-soil growth mediums can include hydroponic growing pads, hydroponic lava rock, coco coir, rockwool, expanded clay pellets, growstones, peat moss, and other non-soil growth mediums known in the art. As described with respect to FIGS. 6A-6D, the box 100 can also be adapted for use with soil-based growth mediums.

FIG. 5B illustrates a second configuration of the box 100 for use during a maturation phase (e.g., post-germination phase) of plant growth. In the second configuration, the third modular element 130 is positioned such that the first surface 132 is facing generally downwards and the ridge 134 provides a base for the box 100. As a result, the second surface 133 faces generally upwards and provides a platform for the plate 112 of the first modular element 110 to engage. In some embodiments, the third modular element 130 can be omitted in the second configuration and the first modular element 110 can be placed directly on a storage surface (e.g., a floor, a shelf, etc.). In contrast with the first configuration, the first modular element 110 is oriented such that the plate 112 is a floor and/or base and the plurality of walls 114 extend generally upward therefrom. The chamber 115 (FIG. 2) of the first modular element 110 therefore defines a reservoir 117. The reservoir 117 can receive and retain water W to facilitate wetting of the growth medium 540, described below.

The second modular element 120 can engage the first modular element 110 in a similar manner as in the first configuration but with a "flipped" orientation. For example, the second modular element 120 is positioned at least partially within the first modular element 110. As described above, the second modular element 120 is sized and shaped such that the platform 122 and the rim 124 can fit within an internal dimension of the plurality of walls 114. The tabs 126 or other flange can engage an upper portion of the walls 114 (e.g., a portion of the walls 114 spaced apart from the plate 112) to suspend the second modular element 120 above the reservoir 117. The rim 124 can be in contact with or spaced apart from the walls 114. When assembled in the second configuration, the first surface 122a of the platform 122 faces generally upward and is exposed to an environment external to the box, and the second surface 122b of the platform 122 faces generally downward towards the reservoir 117 and the plate 112.

In the second configuration, the first surface 122a of the platform 122 is configured to support the growth medium 540. During the post-germination growth phase, the plants 555 may require relatively more light than during the germination phase. Accordingly, the growth medium 540 with the plants 555 sprouting from the seeds 550 can be placed on the first surface 122a of the platform 122 and exposed to a natural or artificial light source.

Furthermore, to reduce the need of manually watering the plants during the post-germination phase, water W can be placed within the reservoir 117 positioned below the platform 122 and growth medium 540. A wick 560 can be placed across the first surface 122a of the platform 122 between the platform 122 and the growth medium 540. A first end portion 560a of the wick 560 can extend through the first gap 125a (FIG. 3) between the platform 122 and the rim 124 and into the water W. A second end portion 560b of the wick 560 can extend through the second gap 125b (FIG. 3) between the platform 122 and the rim 124 and into the water W. The wick 560 can transport water W from the at least partially submerged first end portion 560a and the at least partially submerged second end portion 560b to the portion of the wick 560 underneath the growth medium 540 (e.g., via capillary flow). Although described as having two end portions submerged in the water, the wick 560 can have more or fewer portions submerged in the water W and still transport water to the growth medium 540. At least a portion of the transported water W can wet the growth medium 540 and provide water to the plants 555, while excess water W can drain back into the reservoir 117 via the apertures 123 (FIG. 3).

The wick 560 can be composed of any material suitable for transporting water from the reservoir to the growth medium 540. For example, the wick 560 can be a porous material suitable to induce capillary flow of water therethrough. In some embodiments, the wick 560 is a fibrous material (e.g., a paper towel), a cotton material, a burlap material, rope, string, or the like. In some embodiments, such as when the growth medium 540 is a non-soil growth medium, the wick 560 is configured to be positioned under and cover the entire bottom surface of the growth medium 540. This ensures that the roots of the plants 555 are in contact with (and/or near contact with) water transported from the reservoir 117 to the platform 122 via the wick 560. In other embodiments, the wick 560 does not cover the entire bottom surface of the growth medium 540. For example, the wick 560 can be a plurality of individual and spaced apart strings extending beneath the growth medium 540. In such embodiments, water W transported from the reservoir 117 to the platform 122 via the strings can diffuse through the growth medium 540 to contact the plant roots.

The box 100 can remain in the second configuration until the plants 555 are ready for harvesting. Accordingly, the second configuration can provide a self-contained, self-watering system for growing plants during a post-germination phase. However, the box 100 can also be assembled in a third configuration for transporting the box while the plants are in the post-germination growth phase. FIG. 5C, for example, illustrates the box 100 assembled in a portable configuration. In the portable configuration, the first modular element 110, the second modular element 120, and the third modular element 130 are assembled in a similar configuration to the first configuration (FIG. 5A). For example, the third modular element 130 acts as a base, the second modular element 120 sits on the base, and the first modular element 110 is positioned over the second modular element 120 and the third modular element 130 to provide a self-contained unit. However, in the third configuration, the wick 560 can be folded and placed on the second surface 122a of the platform 122. The growth medium 540 with the plants 555 can also be placed on second surface 122a of the platform 122. As a result, the plants 555 are within the generally enclosed chamber 118 and are protected from outside interference during transportation of the box 100. Following transportation, the box 100 can be reassembled in the second configuration for further growth and/or maintenance.

Figure 6A:
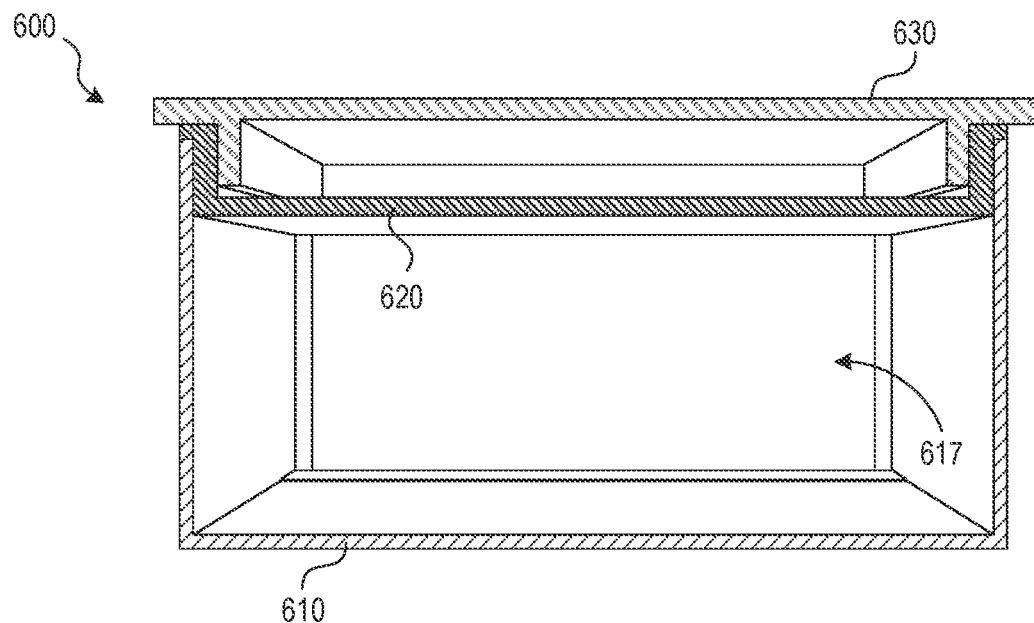
FIGS. 6A-6D illustrate aspects of a modular grow box for growing microgreens and other plants using a soil-based growth medium and configured in accordance with select embodiments of the present technology.
Figure 6B:
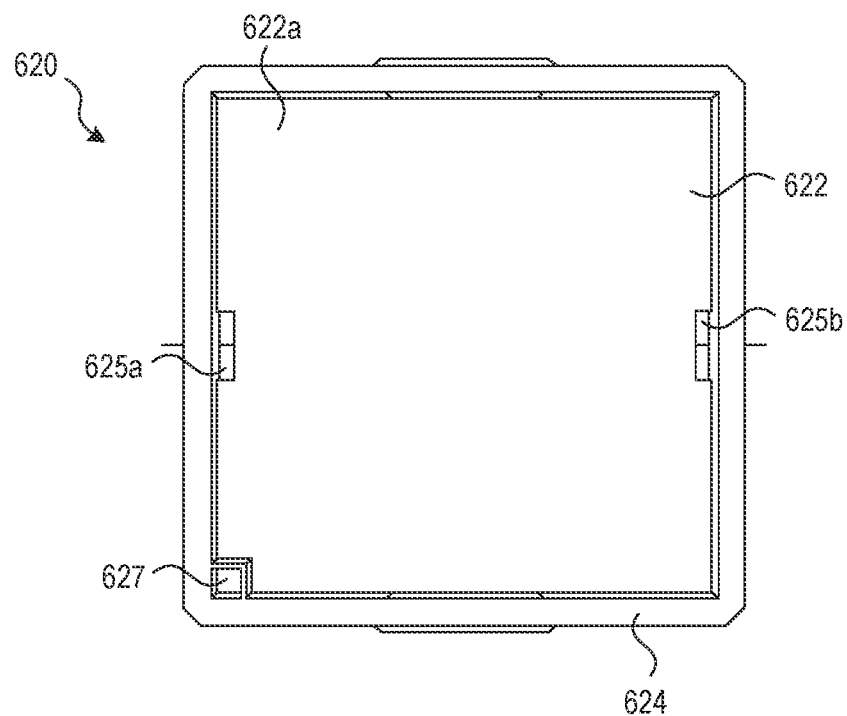

FIGS. 6A-6D illustrate a modular grow box 600 ("box 600") configured for use with a soil-based growth medium. Referring to FIG. 6A, the box 600 can be generally similar in many aspects to the box 100, and can include, for example, a first modular element 610, a second modular element 620, and a third modular element 630. The first modular element 610 can be generally similar to the first modular element 110 and the third modular element 630 can be generally similar to the third modular element 130. Referring to FIG. 6B, the second modular element 620 can include a platform 622 and a rim 624 extending around an outer perimeter of the platform 622. Unlike the second modular element 120, the platform 622 on the second modular element 620 does not include a plurality of apertures extending between a first surface 622a and a second surface (not shown) of the platform 622. The platform 622 includes a first gap 625a and a second gap 625b. As described below, the first gap 625a and the second gap 625b can be configured to receive a wick (not shown) to transport water from a reservoir to the platform 622. The first modular element can also include an access port 627. As described below, the access port 627 enables a user to add water to a reservoir 617 defined by the first modular element 610.

Figure 6C:
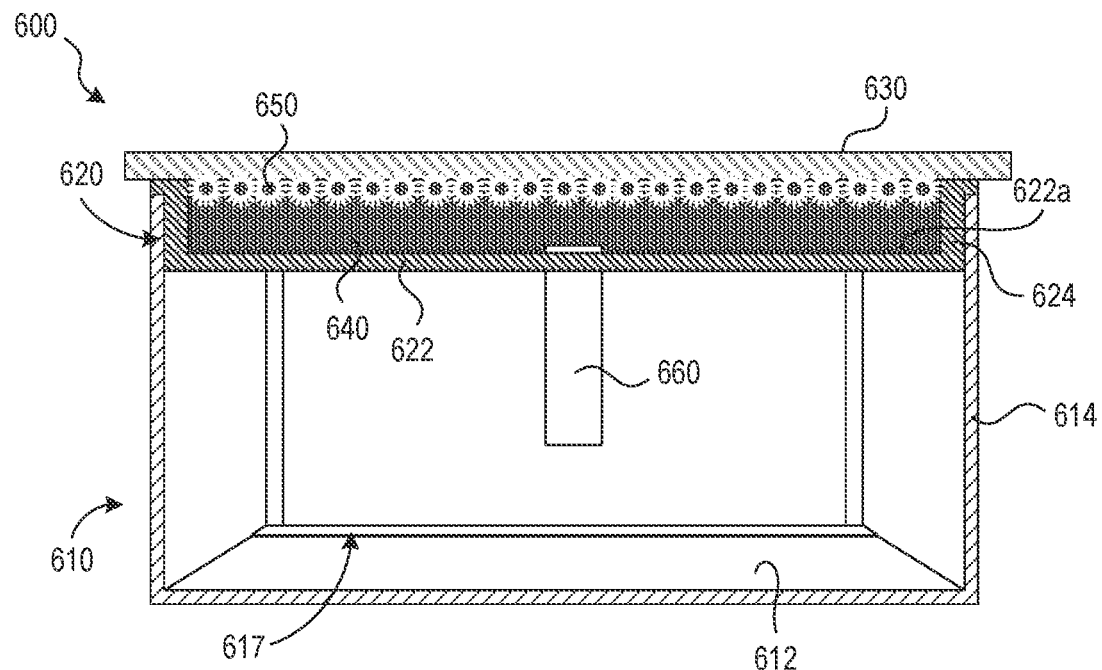

FIG. 6C illustrates a first configuration of the box 600 for use during a germination phase. As illustrated, the first modular element 610 is positioned such that the plate 612 acts as a base and the plurality of walls 614 extend generally upward to form the reservoir 617. Similar to the second configuration of box 100, the second modular element 620 can be positioned within the first modular element 610 and suspended therefrom above the reservoir 617. A soil-based growth medium 640 such as soil can be placed on the first surface 622a of the platform 622. Seeds 650 can be placed in the growth medium 640. A wick 660 can extend underneath a portion of the growth medium 640 and be threaded through the first gap 625a and/or the second gap 625b such that a portion of the wick 660 resides within the reservoir 617. The wick 660 can be generally similar to the wick 560. However, the wick 660 only extends under a portion of the growth medium 640 to avoid over wetting the growth medium 640. The third modular element 630 can be placed over the second modular element 620 to act as a cover to the growth medium 640, thereby forming a generally enclosed area for the growth medium 640 that is shielded from an environment external to the box 600. This is expected to advantageously provide a relatively dark environment to encourage germination of the seeds 650.

Figure 6D:
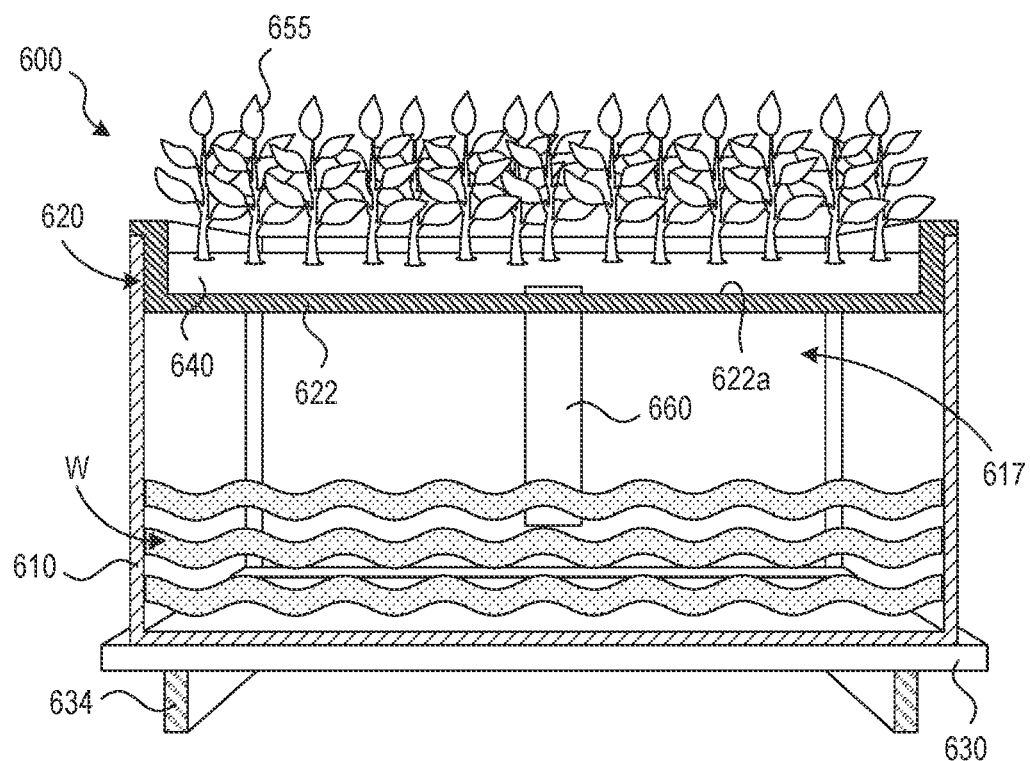

FIG. 6D illustrates a second configuration of the box 600 for use during a post-germination growth phase. In the second configuration, the third modular element 630 is removed from the second modular element 620 to expose the growth medium 640 and plants 655 to the surrounding environment. In contrast to the embodiment described above with reference to FIGS. 5A-5C, the growth medium 640 remains on the first surface 622a of the platform 622 in both the first configuration and the second configuration. The third modular element 630 can optionally be positioned generally below the first modular element 610 to form a base for the box 600, as described above with respect to FIG. 5B. Water W can be added to the reservoir 617 (e.g., via the access port 627, FIG. 6B) and transported to the growth medium 640 via the wick 660. The access port 627 on the second modular element 620 permits water to be added to the reservoir 617 without disconnecting the second modular element 620 and the first modular element 610.

Figure 7A:
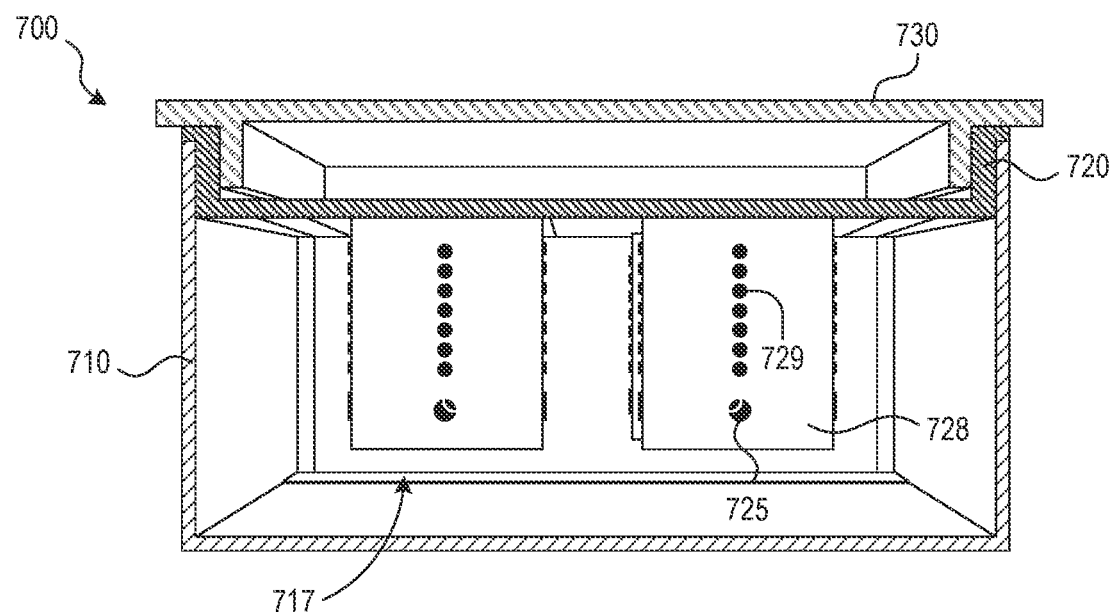
FIGS. 7A-7F illustrate aspects of a modular grow box for growing multiple plants and configured in accordance with select embodiments of the present technology.
Figure 7B:
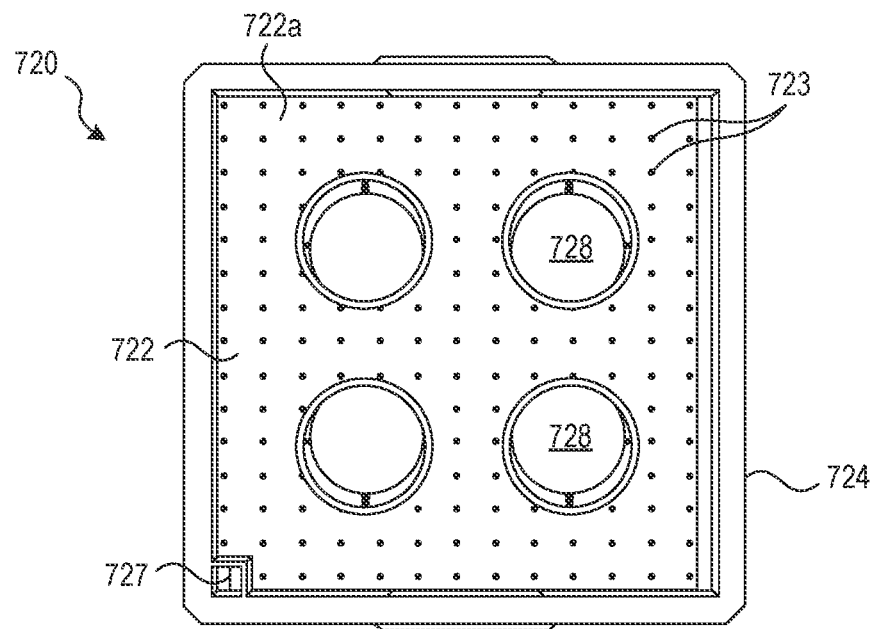
Figure 7C:
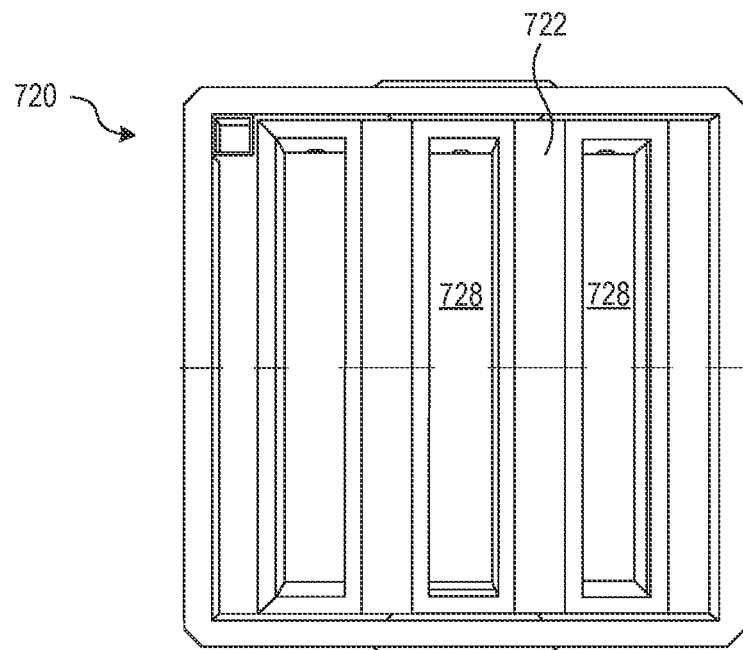
Figure 7D:
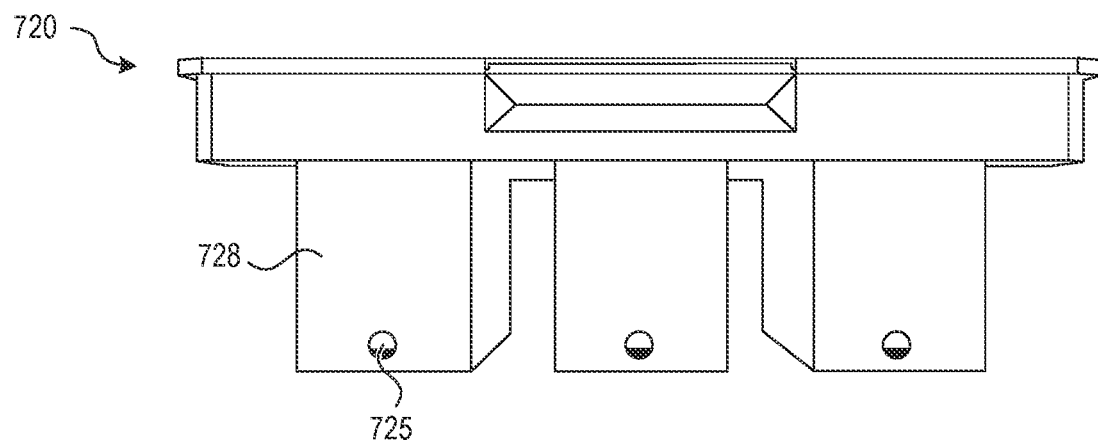

FIGS. 7A-7F illustrate a modular grow box 700 ("box 700") configured to support growth of multiple plants having a generally deeper root profile than typically associated with microgreens. Referring to FIG. 7A, certain aspects of the box 700 can be generally similar to the box 100, and can include, for example, a first modular element 710, a second modular element 720, and a third modular element 730. The first modular element 710 can be generally similar to the first modular element 110 and the third modular element 730 can be generally similar to the third modular element 130. Referring to FIG. 7B, the second modular element 720 can include a platform 722 and a rim 724 extending around an outer perimeter of the platform 722. The platform 722 can include a plurality of apertures 723 extending between a first surface 722a and a second surface (not shown) of the platform 722 for aerating and/or draining the platform 722. The platform 722 can also include a plurality of root pods 728 having aeration pores 729 and a wicking pore 725 (FIG. 7A). The root pods 728 can be generally cylindrical in shape and extend in a direction generally opposite of the rim 724. In other embodiments, the root pods 728 can have other suitable shapes, such has rectangular, polyhedral, curvilinear, and the like. The root pods 728 can be configured to receive soil and provide room to accommodate root and/or other plant growth. Although illustrated as having four cylindrical root pods 728, in other embodiments the platform 722 can have one, two, three, five, six, seven, eight, or more root pods 728 of varying sizes and/or shapes. For example, FIGS. 7C and 7D illustrate another embodiment of the second modular element 720, in which the plurality of root pods 728 have a generally rectangular shape and extend in parallel along a width of the platform 722.

Figure 7E:
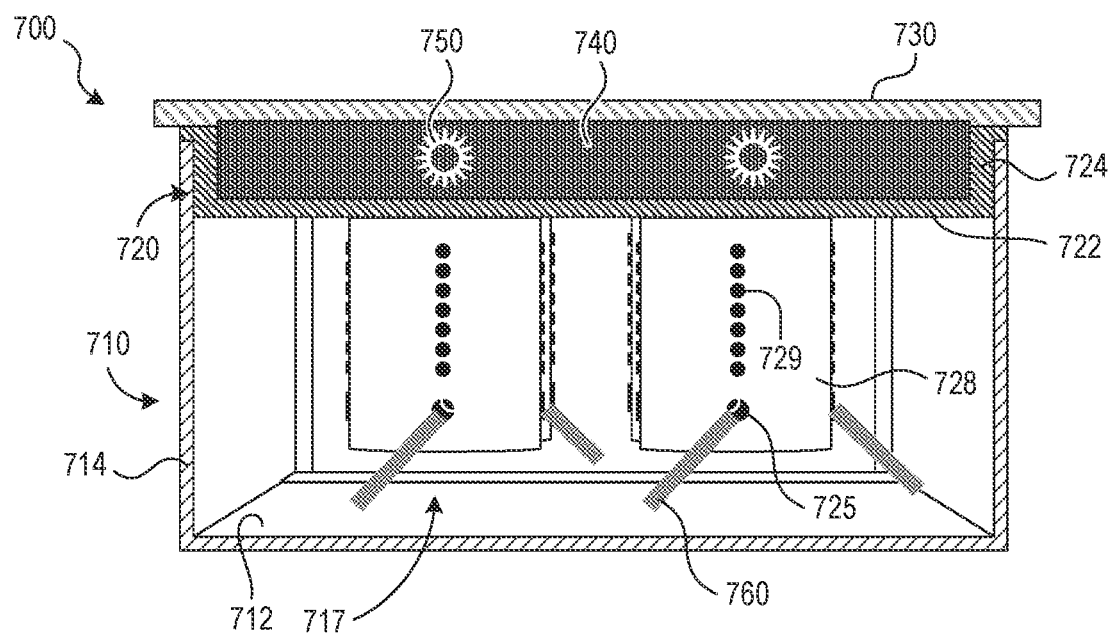

FIG. 7E illustrates a first configuration of the box 700 for use during a germination phase. As illustrated, the first modular element 710 is positioned such that the plate 712 acts as a base and the plurality of walls 714 extend generally upward to define a reservoir 717. Similar to the second configuration of box 100, the second modular element 720 can be positioned within the first modular element 710 and suspended therefrom above the reservoir 717. The root pods 728 extend generally downward from the platform 722 and into the reservoir 717. The platform 722 and the root pods 728 can be filled with a growth medium 740 (e.g., soil or other suitable medium), and seeds 750 can be disposed within the growth medium 740. A wick 760 can extend from within the root pod 728, through the wicking pore 725, and into the reservoir 717. The third modular element 730 can be placed over the second modular element 720 to act as a cover to the growth medium 740, thereby forming a generally enclosed area for the growth medium 740 that is shielded from an environment external to the box 700. This is expected to advantageously provide a relatively dark environment to encourage germination of the seeds 750.

Figure 7F:
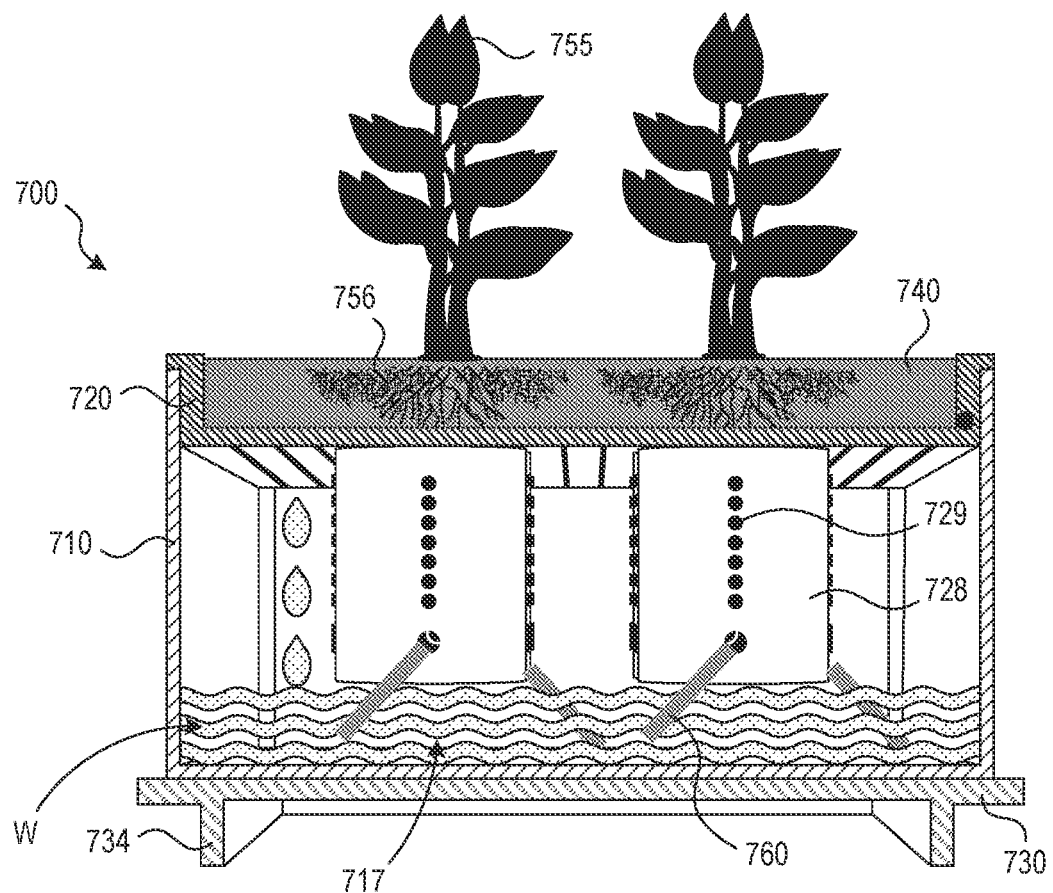

FIG. 7F illustrates a second configuration of the box 700 for use during a post-germination growth phase. In the second configuration, the third modular element 730 is removed from the second modular element 720 to expose the growth medium 740 and plants 755 to the surrounding environment. The third modular element 730 can optionally be positioned generally below the first modular element 710 to form a base for the box 700, as described above with respect to FIG. 5B. Water W can be added to the reservoir 717 and transported to the growth medium 740 via the wick 760. The root base 756 of the plants 755 can grow generally downward into the root pods 728 as the plants 755 grow.

Figure 8A:
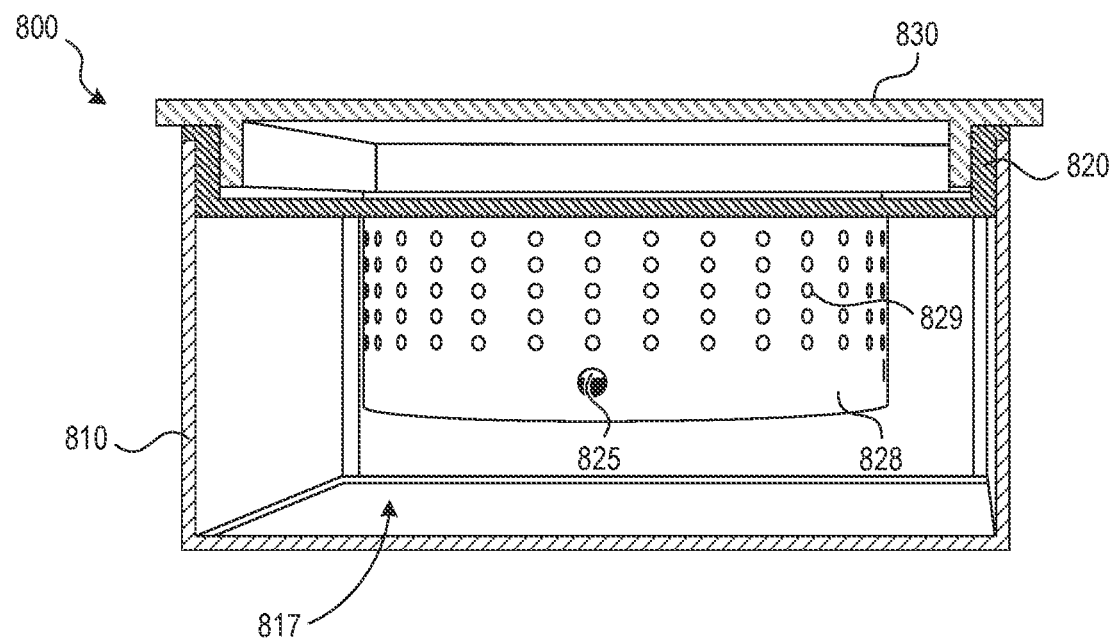
FIGS. 8A-8D illustrate aspects of a modular grow box for growing a relatively large plant and configured in accordance with select embodiments of the present technology.
Figure 8B:
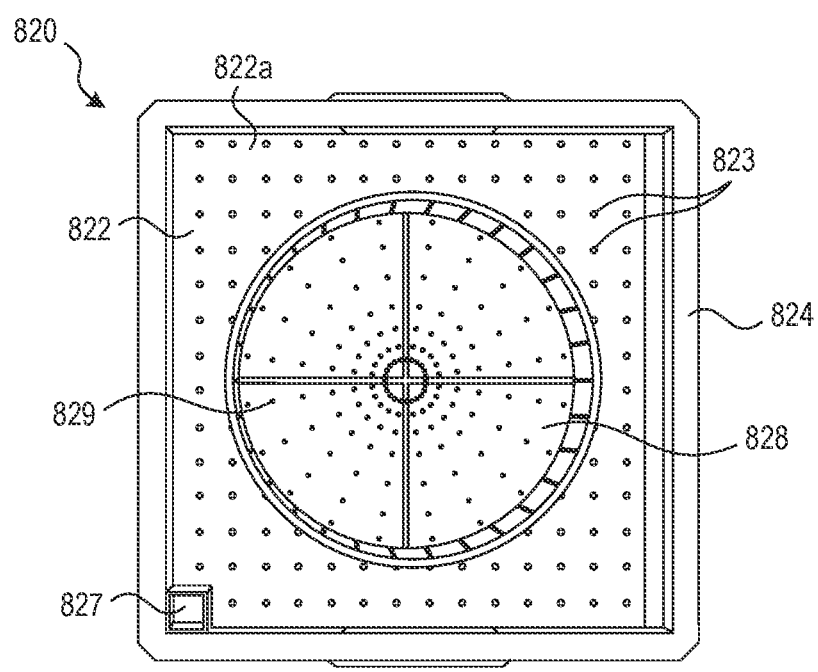

FIGS. 8A-8D illustrate a modular grow box 800 ("box 800") configured to support growth of a relatively large plant having a generally deeper root profile than typically associated with microgreens. Referring to FIG. 8A, certain aspects of the box 800 can be generally similar to the box 100, and can include, for example, a first modular element 810, a second modular element 820, and a third modular element 830. The first modular element 810 can be generally similar to the first modular element 110 and the third modular element 830 can be generally similar to the third modular element 130. Referring to FIG. 8B, the second modular element 820 can include a platform 822 and a rim 824 extending around an outer perimeter of the platform 822. The platform 822 can include a plurality of apertures 823 extending between a first surface 822a and a second surface (not shown) of the platform 822 for aerating and/or draining the platform 822. The platform 822 can also include a root pod 828 having aeration pores 829 and a wicking pore 825 (FIG. 8A). The root pod 828 can be generally cylindrical in shape and extend in a direction generally opposite of the rim 824. In other embodiments, the root pod 828 can have other suitable shapes, such has rectangular, polyhedral, curvilinear, or the like. In some embodiments, the root pod 828 can extend across the entire width (and/or substantially the entire width) of the platform 822 (e.g., between opposing sections of the rim 824). For example, in some embodiments the root pod 828 can be rectangular and occupy the entire surface area (and/or about the entire surface area) of the platform 822. The root pod 828 can be configured to receive soil and provide a room to accommodate root growth.

Figure 8C:
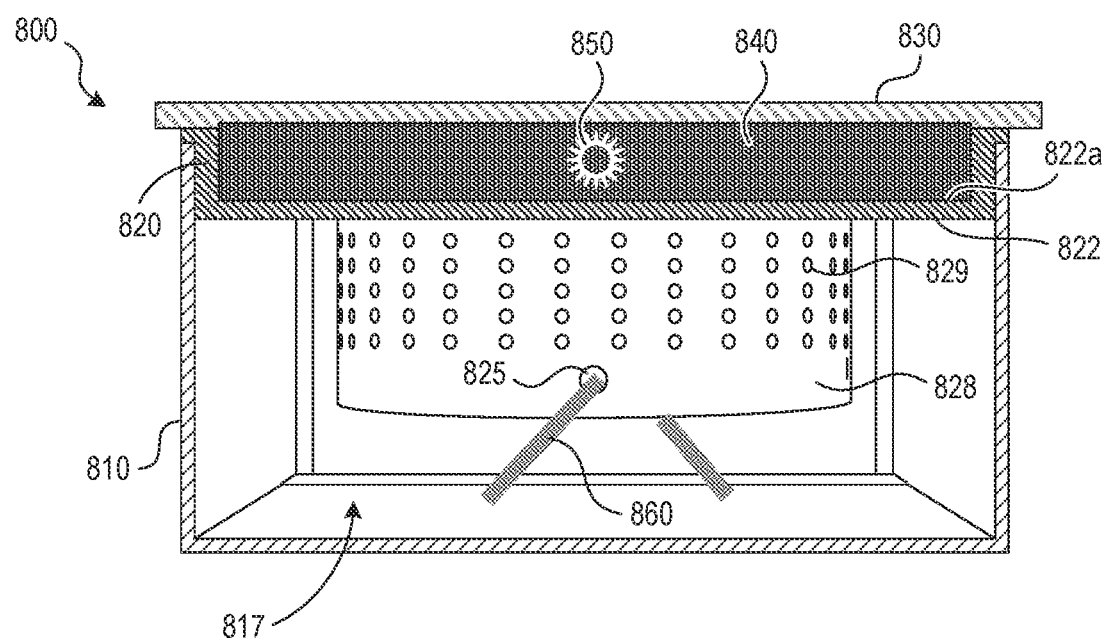

FIG. 8C illustrates a first configuration of the box 800 for use during a germination phase. As illustrated, the first modular element 810 is positioned such that the plate 812 acts as a base and the plurality of walls 814 extend generally upward to form a reservoir 817. Similar to the second configuration of box 100, the second modular element 820 can be positioned within the first modular element 810 and suspended therefrom above the reservoir 817. The root pod 828 extends generally downward from the platform 822 and into the reservoir 817. The platform 822 and the root pod 828 can be filled with a growth medium 840 (e.g., soil or other suitable medium), and seeds 850 can be disposed within the growth medium 840. A wick 860 can extend from within the root pod 828, through the wicking pore 825, and into the reservoir 817. The third modular element 830 can be placed over the second modular element 820 to act as a cover to the growth medium 840, thereby forming a generally enclosed area for the growth medium 840 that is shielded from an environment external to the box 800. This is expected to advantageously provide a relatively dark environment to encourage germination of the seeds 850.

Figure 8D:
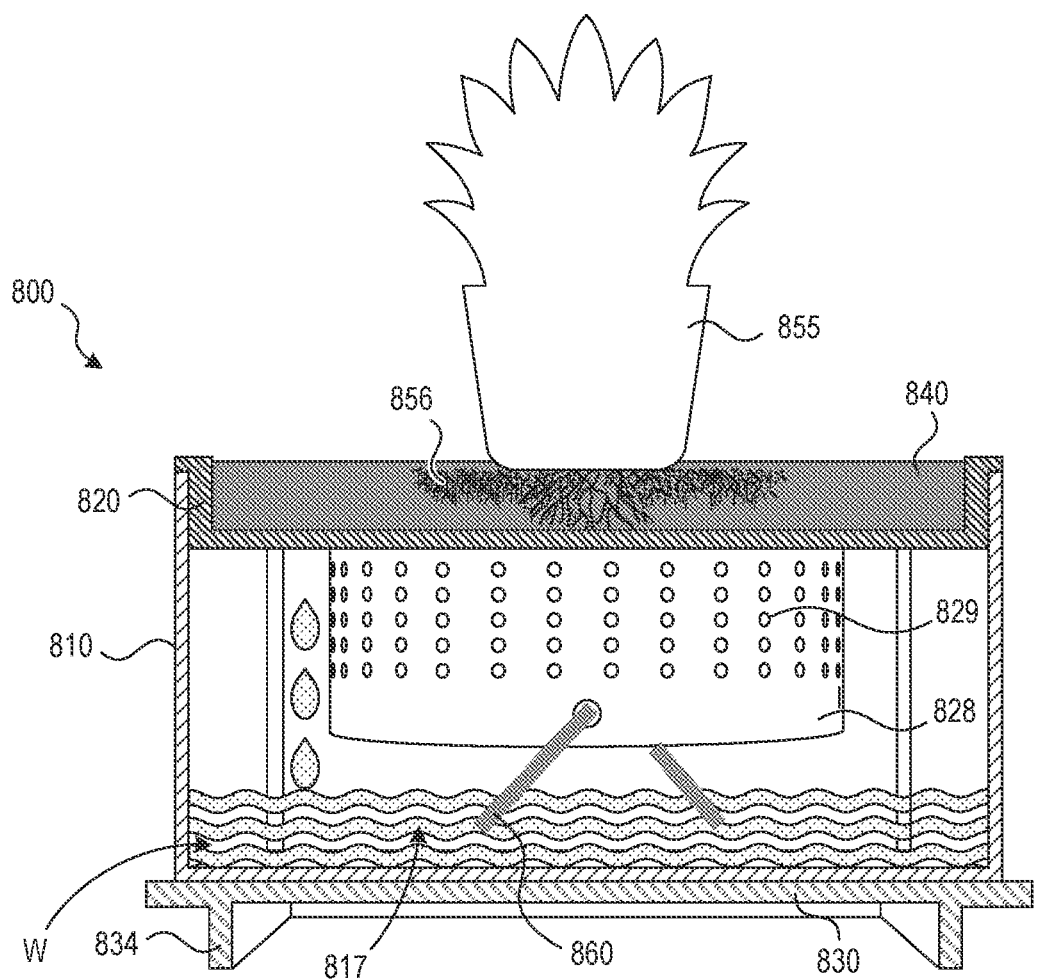

FIG. 8D illustrates a second configuration of the box 800 for use during a post-germination growth phase. In the second configuration, the third modular element 830 is removed from the second modular element 820 to expose the growth medium 840 and plants 855 to the surrounding environment. The third modular element 830 can optionally be positioned generally below the first modular element 810 to form a base for the box 800, as described above with respect to FIG. 5B. Water W can be added to the reservoir 817 and transported to the growth medium 840 via the wick 860. The root base 856 of the plant 855 can grow generally downward into the root pod 828 as the plant 855 grows.

Figure 9:
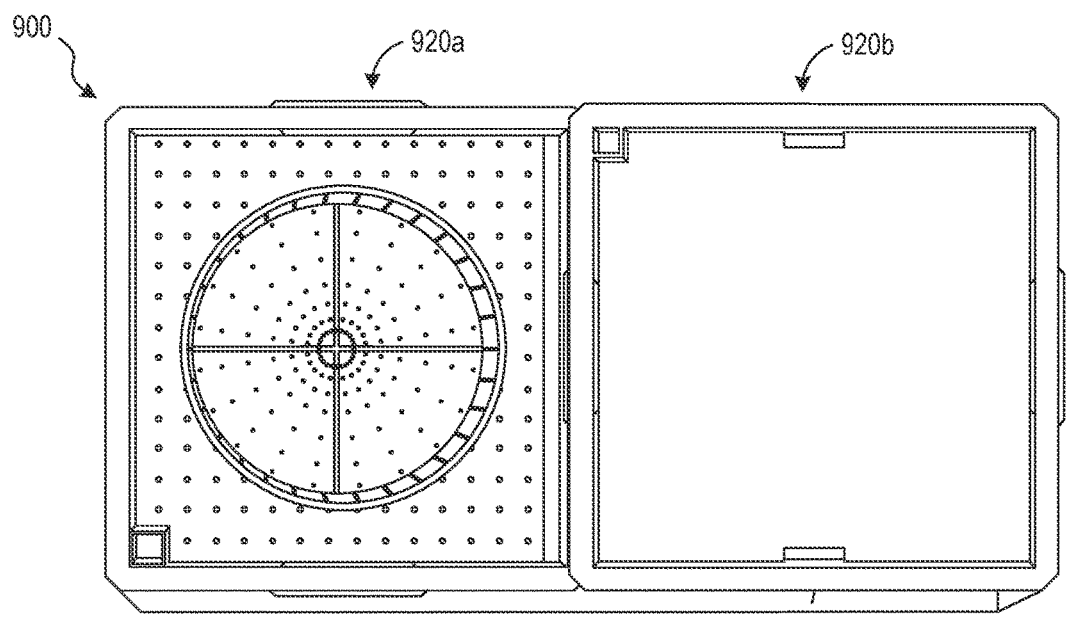
FIG. 9 illustrates a modular grow box for growing multiple types of plants at the same time and configured in accordance with select embodiments of the present technology.

FIG. 9 illustrates a modular grow box 900 ("box 900") for growing different types of plants in tandem and configured in accordance with select embodiments of the present technology. Certain aspects of the box 900 can be generally similar to the box 100, and can include, for example, a first modular element (not shown), a second modular element, and a third modular element (not shown). However, box 900 includes a plurality of second modular elements 920a and 920b that can be at least partially positioned within and suspended above the first modular element at the same time. To provide space for the multiple second modular elements 920a and 920b, the first modular element can be enlarged relative to the second modular elements 920a and 920b and/or the second modular elements 920a and 920b can be smaller relative to the first modular element. In the illustrated embodiment, the second modular element 920a is generally similar to the second modular element 820 (FIGS. 8A-8D) and the second modular element 920b is generally similar to the second modular element 620 (FIGS. 6A-6D). Accordingly, this enables the grow box 900 to simultaneously support growth of microgreens (using the second modular element 920b) and a plant with a relatively larger root profile (using the second modular element 920a). As one skilled in the art will appreciate, however, any combination of second modular elements could be selected for use with the box 900 to support growth of any combination of plants. Similarly, the same or different growth mediums could be used in the multiple second modular elements. Moreover, in some embodiments the first modular element can be sized to retain more than two second modular elements (e.g., three, four, five, six, etc.).

Figure 10:
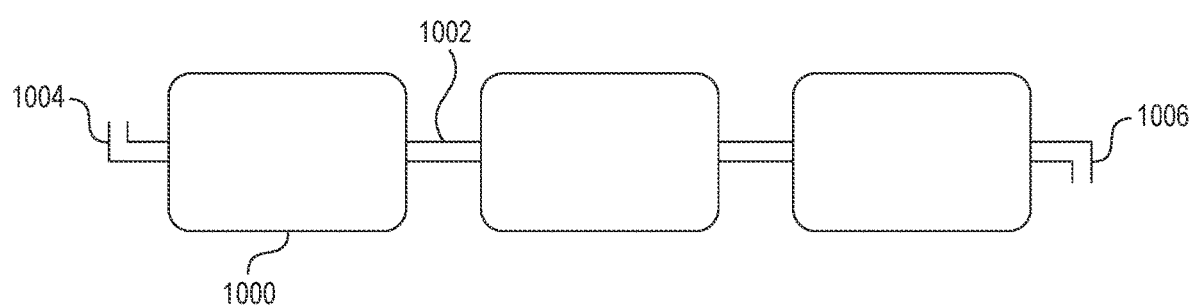
FIG. 10 illustrates a plurality of grow boxes arranged in series and configured in accordance with select embodiments of the present technology.
Figure 11:
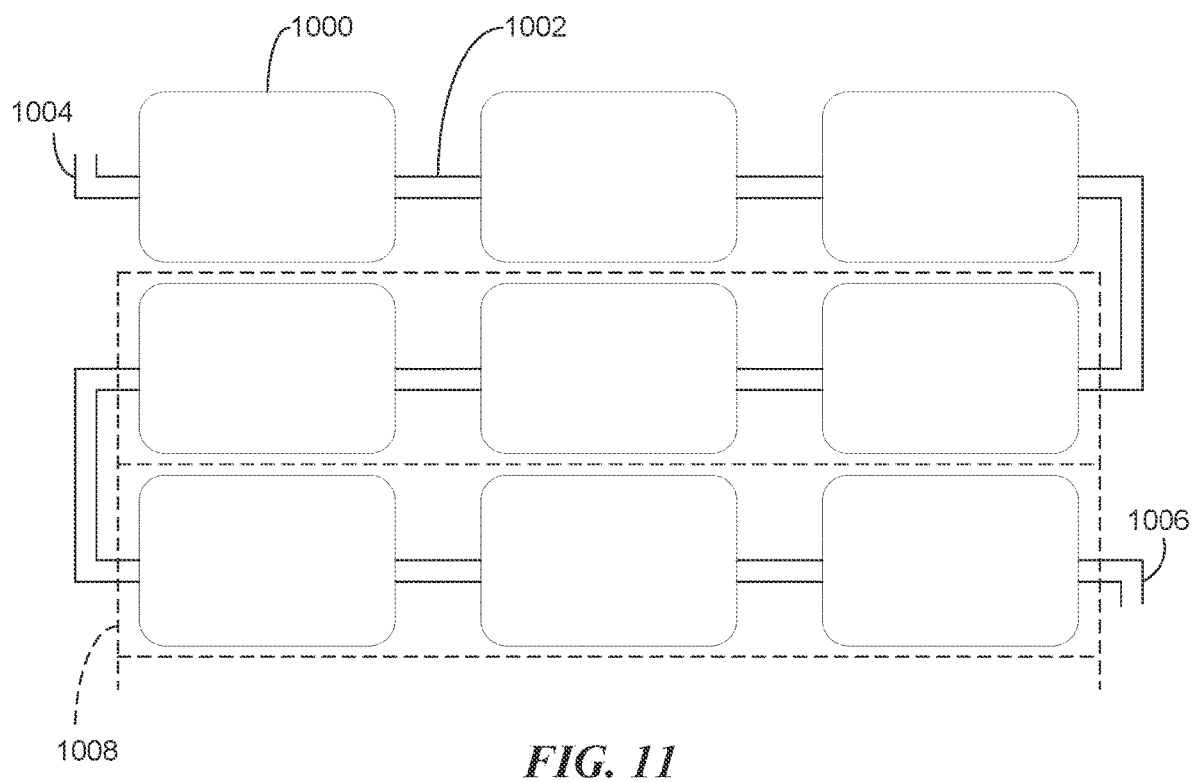
FIG. 11 illustrates a plurality of grow boxes arranged in series and configured in accordance with select embodiments of the present technology.

FIGS. 10 and 11 illustrate grow systems having a plurality of grow boxes 1000 ("boxes 1000") connected in series and configured in accordance with select embodiments of the present technology. The grow boxes 1000 can be boxes 100, 600, 700, 800, and/or 900, as described in detail above, or any other suitable grow boxes. In some embodiments, the plurality of boxes 1000 are all the same type. In other embodiments, a combination of different box types may be connected to form the plurality of boxes 1000.

Referring to FIG. 10, the plurality of boxes 1000 are fluidly connected via a hose 1002 or other suitable structure that permits water to flow between the plurality of boxes. At least one of the plurality of boxes 1000 includes an inlet 1004 for receiving water and/or a nutrient solution, and at least one of the plurality of boxes 1000 includes a drain 1006 for permitting excess water to flow out of the boxes 1000. Accordingly, inputting water into the system via the inlet 1004 causes water to flow to each of the boxes 1000 via the hose 1002. In some embodiments, the water and/or nutrient solution received at the drain 1006 can be pumped to and reinserted into the system via the inlet 1004 to promote the reuse of the water and/or nutrient solution. As described herein, each of the boxes 1000 can be transitionable between a first configuration providing a generally enclosed area for a growth medium during a germination phase and a second configuration providing a partially exposed area for the growth medium during a post-germination phase. Referring to FIG. 11, the plurality of boxes 1000 can also be stacked on a shelving unit 1008 or other suitable structure designed to increase the number of boxes 1000 that can fit in a given space. When stacked, each of the plurality of boxes 1000 remains fluidly connected via a hose 1002.

As one skilled in the art will appreciate from the disclosure herein, the modular grow boxes described herein can be used to grow microgreens and other plants for personal consumption, for commercial use, and/or for other purposes. Without being bound by theory, various embodiments of the present technology provide a self-contained, self-watering, mobile apparatus for growing microgreens and other plants that is expected to reduce the manual labor typically required to grow such plants.

The dimensions of the modular grow boxes described herein can range from a relatively small (e.g., portable) size suitable for personal use and a relatively large size suitable for commercial and/or stationary applications. In some embodiments, for example, the modular grow boxes can have a height between about 2 inches and about 2 feet, a width between about 4 inches and about 4 feet, and a depth between about 4 inches and about 4 feet when assembled. In other embodiments, the modular grow boxes can have dimensions outside the foregoing ranges.

The modular grow boxes described herein can be composed of renewable materials, recyclable materials, non-recyclable materials, compostable materials, and/or biodegradable materials. For example, the modular grow boxes can be composed of plastic, wood, foam, steel, stainless steel, metal, glass, combinations thereof, or other suitable materials. The modular elements can be made via molding, welding, 3D printing, or any other technique known in the art and suitable for forming said elements.

As one skilled in the art will appreciate from the foregoing disclosure, various modifications to the described embodiments can be made without deviating from the scope of the present technology. For example, many of the components described with respect to a particular embodiment can be incorporated into or used with various components described with respect to a different embodiment. Moreover, certain features can be omitted from, or added to, the described embodiments without deviating from the scope of the present technology. Likewise, although steps are presented in a given order, alternative embodiments may perform steps in a different order. Accordingly, the present technology is not limited to the embodiments specifically identified herein.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. As used herein, the phrase "and/or" as in "A and/or B" refers to A alone, B alone, and A and B.

Where a range of values is provided, it is understood that each intervening value, to the tenth of the unit of the lower limit unless the context clearly dictates otherwise, to between the upper and lower limits of that range is also specifically disclosed. Each smaller range between any stated value or intervening value in a stated range and any other stated or intervening value in that stated range is encompassed within the disclosure. The upper and lower limits of these smaller ranges may independently be included or excluded in the range, and each range where either, neither, or both limits are included in the smaller ranges is also encompassed within the disclosure, subject to any specifically excluded limit in the stated range. Where the stated range includes one or both of the limits, ranges excluding either or both of those included limits are also included in the disclosure.

It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A method for growing plants using a modular grow box having a first modular element and a second modular element, the method comprising:
    assembling the modular grow box in a first configuration for a first growth phase, wherein assembling the modular grow box in the first configuration includes:
        placing a growth material with one or more seeds on a first surface of the second modular element, and
        placing the first modular element over the second modular element, wherein the first modular element includes a plate and one or more walls extending from an outer perimeter of the plate, and wherein placing the first modular element over the second modular element includes placing the plate above the first surface to shelter the growth material and the one or more seeds from an environment external to the modular grow box; and
    after the first growth phase, assembling the modular grow box in a second configuration for a second growth phase, wherein assembling the modular grow box in the second configuration includes:
        placing the first modular element under the second modular element, and
        placing the growth material on a second surface of the second modular element that is opposite the first surface,
        wherein, in the second configuration, the first modular element is configured to retain water and the growth material is exposed to the environment external to the modular grow box.

2. The method of claim 1 wherein the first growth phase corresponds to a germination phase for the one or more seeds, and wherein the second growth phase corresponds to a post-germination phase for the one or more seeds.

3. The method of claim 1 wherein in the first configuration, the first modular element and the second modular element collectively form a substantially enclosed humidity chamber, and wherein the growth material and the one or more seeds are positioned within the humidity chamber for the first growth phase.

4. The method of claim 1 wherein assembling the modular grow box in the second configuration for the second growth phase further includes placing a wick between the growth material and the second surface of the second modular element, wherein the wick extends into a reservoir defined by the first modular element, and wherein the reservoir is configured to retain the water.

5. The method of claim 1 wherein assembling the modular grow box in the second configuration includes rotating the first modular element by about 180 degrees about a horizontal axis relative to its position in the first configuration.

6. The method of claim 1 wherein assembling the modular grow box in the second configuration includes rotating the second modular element by about 180 degrees about a horizontal axis relative to its position in the first configuration.

7. The method of claim 1 wherein the modular grow box includes a third modular element, and wherein:
    assembling the modular grow box in the first configuration includes positioning the second modular element on the third modular element,
    and assembling the modular grow box in the second configuration includes positioning the first modular element on the third modular element.

8. The method of claim 7 wherein assembling the modular grow box in the second configuration includes rotating the third modular element by about 180 degrees about a horizontal axis relative to its position in the first configuration.

9. The method of claim 1 wherein the growth medium includes a non-soil based growth medium.

10. The method of claim 1 wherein the first growth phase is about 2 to 6 days, and wherein the second growth phase is about 4 to 12 days.

11. A method for growing plants using a modular grow box having a first modular element and a second modular element, the method comprising:
    assembling the modular grow box in a first configuration for a first growth phase, wherein assembling the modular grow box in the first configuration includes:
        placing a growth material with one or more seeds on a first surface of the second modular element, and
        placing the first modular element over the second modular element to form a chamber sheltering the one or more seeds from an environment external to the modular grow box; and
    after the first growth phase, assembling the modular grow box in a second configuration for a second growth phase, wherein assembling the modular grow box in the second configuration includes:
        rotating the second modular element by about 180 degrees about its horizontal axis and moving the growth material to a second surface of the second modular element that is opposite the first surface,
        rotating the first modular element by about 180 degrees about its horizontal axis to form a reservoir configured to retain water, and
        positing the second modular element above the first modular element,
        wherein, in the second configuration, the growth material is exposed to the environment external to the modular grow box.

12. The method of claim 11 wherein assembling the modular grow box in the second configuration for the second growth phase further includes placing a wick between the growth material and the second surface of the second modular element, wherein the wick extends into the reservoir for transporting water from the reservoir toward the growth material.

13. The method of claim 12 wherein the wick extends through a gap in the second modular element.

14. The method of claim 11 wherein the first growth phase corresponds to a germination phase for the one or more seeds, and wherein the second growth phase corresponds to a post-germination phase for the one or more seeds.

15. The method of claim 11 wherein the first growth phase is about 2 to 6 days, and wherein the second growth phase is about 4 to 12 days.

16. A method for growing plants using a grow system having a plurality of fluidically connected modular grow boxes, wherein each modular grow box includes a first modular element and a second modular element, the method comprising:
assembling the plurality of modular grow boxes in a first configuration for the first growth phase, wherein assembling the modular grow boxes in the first configuration includes, for each modular grow box:
placing a growth material with one or more seeds on a first surface of the second modular element; and
placing the first modular element over the second modular element; and
after the first growth phase, assembling the plurality of modular grow boxes in a second configuration for the second growth phase, wherein assembling the modular grow boxes in the second configuration includes, for each modular grow box:
placing the growth material on a second surface of the second modular element that is opposite the first surface, and
placing the first modular element under the second modular element to form a reservoir configured to retain water,
wherein, at least during the second phase, the plurality of modular grow boxes are fluidly connected; and
at least during the second phase, flowing water between the plurality of modular grow boxes.

17. The method of claim 16 wherein the plurality of modular grow boxes includes at least a first modular grow box and a second modular grow box, and wherein:
placing a growth material with one or more seeds in the first modular grow box includes placing a growth material with one or more seeds of a first species; and
placing a growth material with one or more seeds in the second modular grow box includes placing a growth material with one or more seeds of a second species that is different than the first species.

18. The method of claim 17 wherein a duration of the first growth phase and/or the second growth phase is different for the first species and the second species.

19. The method of claim 16 wherein the first growth phase corresponds to a germination phase for the one or more seeds, and wherein the second growth phase corresponds to a post-germination phase for the one or more seeds.

20. The method of claim 16, further comprising vertically stacking at least some of the plurality of modular grow boxes.

* * * * *